United States Patent
Kim

(10) Patent No.: US 11,987,285 B2
(45) Date of Patent: May 21, 2024

(54) SENSING APPARATUS FOR USE IN POWER STEERING SYSTEM OF A VEHICLE

(71) Applicant: LG INNOTEK CO., LTD., Seoul (KR)

(72) Inventor: Tae San Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 359 days.

(21) Appl. No.: 17/312,542

(22) PCT Filed: Nov. 26, 2019

(86) PCT No.: PCT/KR2019/016327
§ 371 (c)(1),
(2) Date: Jun. 10, 2021

(87) PCT Pub. No.: WO2020/130391
PCT Pub. Date: Jun. 25, 2020

(65) Prior Publication Data
US 2022/0055688 A1 Feb. 24, 2022

(30) Foreign Application Priority Data
Dec. 21, 2018 (KR) .................. 10-2018-0166876

(51) Int. Cl.
*G01L 3/02* (2006.01)
*B62D 5/04* (2006.01)
(Continued)

(52) U.S. Cl.
CPC ....... *B62D 15/0215* (2013.01); *B62D 5/0406* (2013.01); *G01L 3/02* (2013.01); *G01L 19/14* (2013.01); *B60Y 2400/307* (2013.01)

(58) Field of Classification Search
None
See application file for complete search history.

(56) References Cited

U.S. PATENT DOCUMENTS 9,296,413 B2 * 3/2016 Tsukada ................. G01L 5/221
10,976,209 B2 * 4/2021 Murakami ............... B62D 6/10
(Continued)

FOREIGN PATENT DOCUMENTS

JP 2004-306898 11/2004
JP 5039036 10/2012
(Continued)

OTHER PUBLICATIONS

International Search Report dated Mar. 3, 2020 issued in Application No. PCT/KR2019/016327.
(Continued)

*Primary Examiner* — Peter J Macchiarolo
*Assistant Examiner* — Jermaine L Jenkins
(74) *Attorney, Agent, or Firm* — KED & ASSOCIATES, LLP

(57) ABSTRACT

An embodiment provides a sensing apparatus comprising: a first rotation part; a second rotation part in which the first rotation part is disposed; a housing in which the second rotation part is disposed; and a first metal member disposed between the housing and the second rotation part, wherein the second rotation part includes a first holder and a second holder combined with the first holder, and the first metal member includes a body disposed between the first holder and the housing and a first flange portion extending radially outward from the body.

19 Claims, 9 Drawing Sheets

(51) Int. Cl.
*B62D 15/02* (2006.01)
*G01L 19/14* (2006.01)

(56) References Cited

U.S. PATENT DOCUMENTS

| | | | |
|---|---|---|---|
| 11,022,510 B2* | 6/2021 | Lee | G01L 5/221 |
| 2015/0040686 A1 | 2/2015 | Maehara et al. | |
| 2020/0156696 A1* | 5/2020 | Hara | B62D 6/10 |
| 2020/0212767 A1* | 7/2020 | Yatsugi | H05K 7/20854 |
| 2021/0036574 A1* | 2/2021 | Hamada | H02K 5/225 |

FOREIGN PATENT DOCUMENTS

| | | |
|---|---|---|
| KR | 10-1800769 | 11/2017 |
| KR | 10-1828879 | 3/2018 |
| WO | WO 2018/088787 | 5/2018 |

OTHER PUBLICATIONS

Korean Office Action dated Jan. 9, 2024 issued in Application No. 10-2018-0166876.

\* cited by examiner

【FIG. 1】
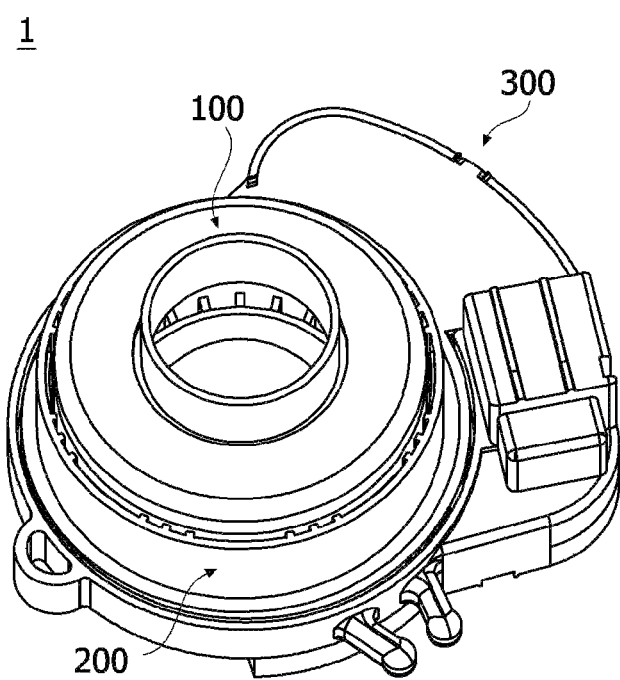

[FIG. 2]
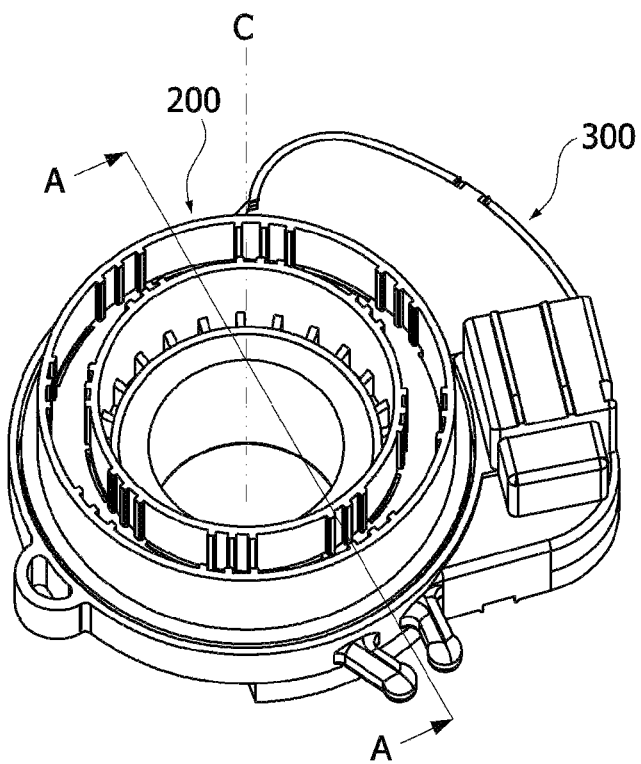

[FIG. 3]
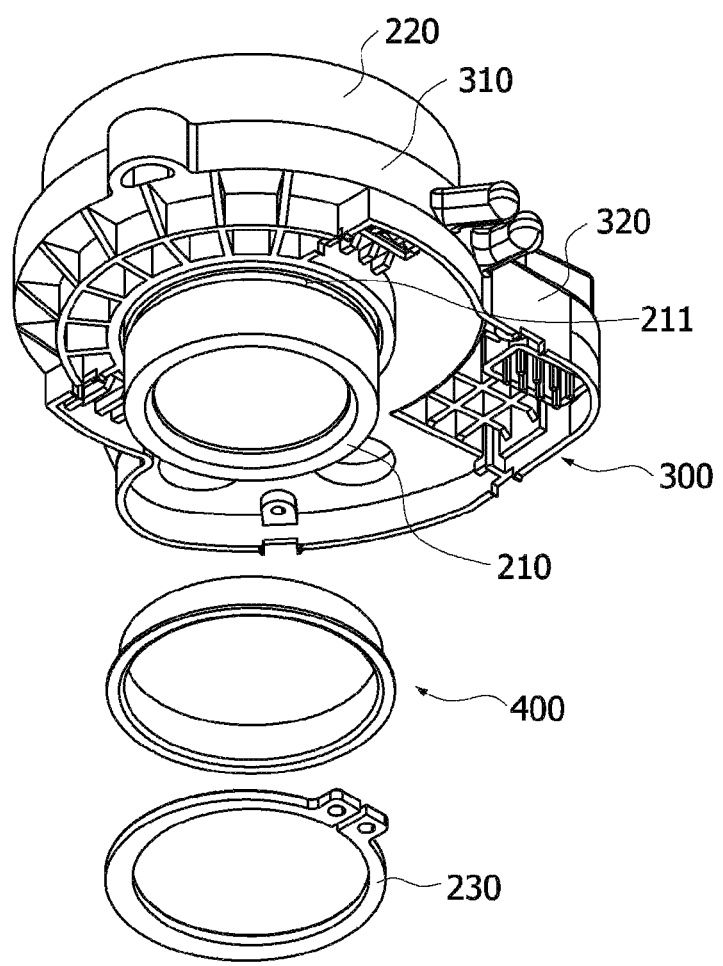

[FIG. 4]
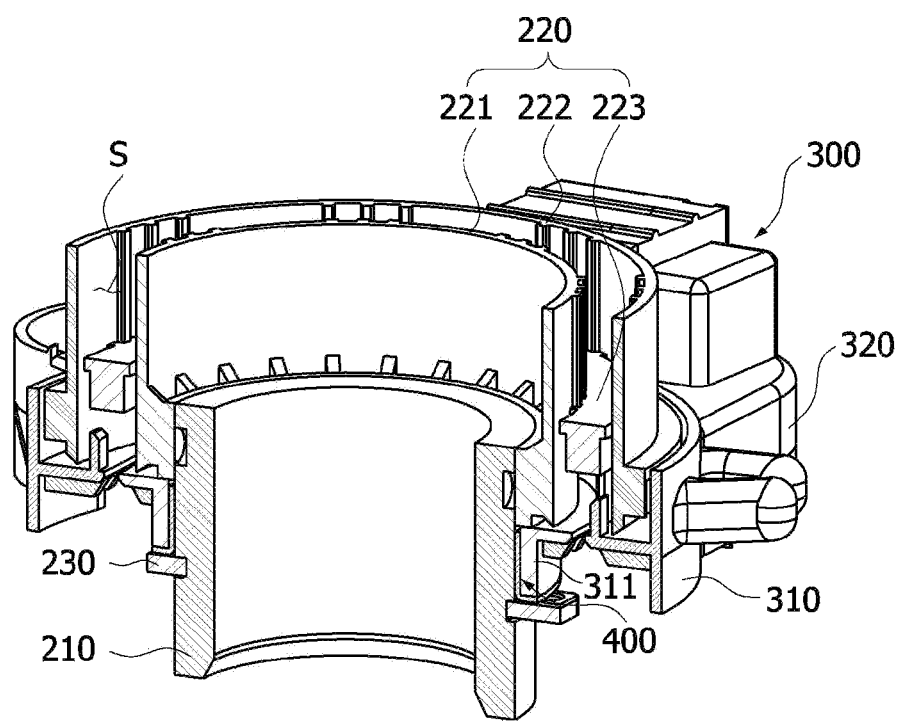

【FIG. 5】
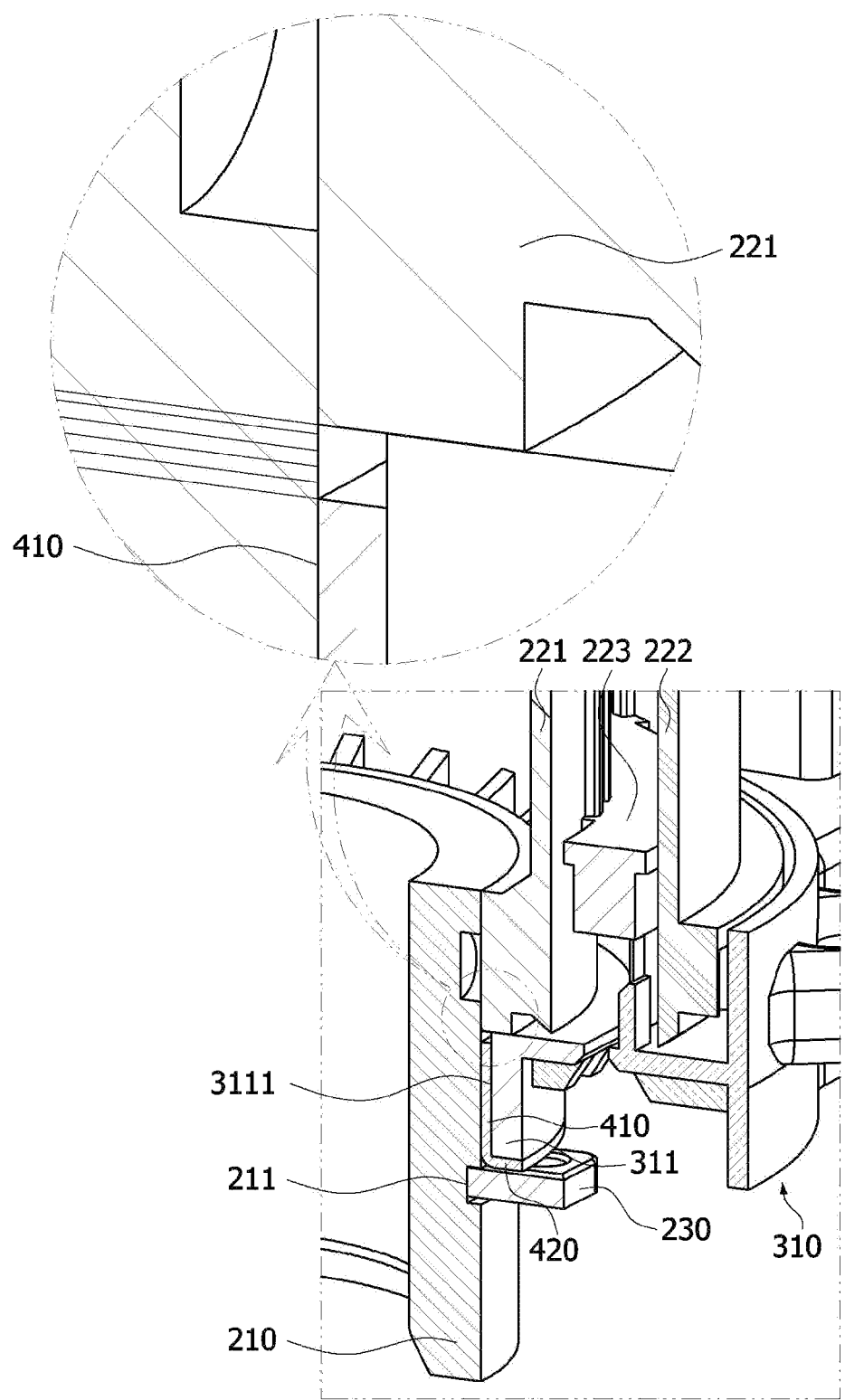

[FIG. 6]
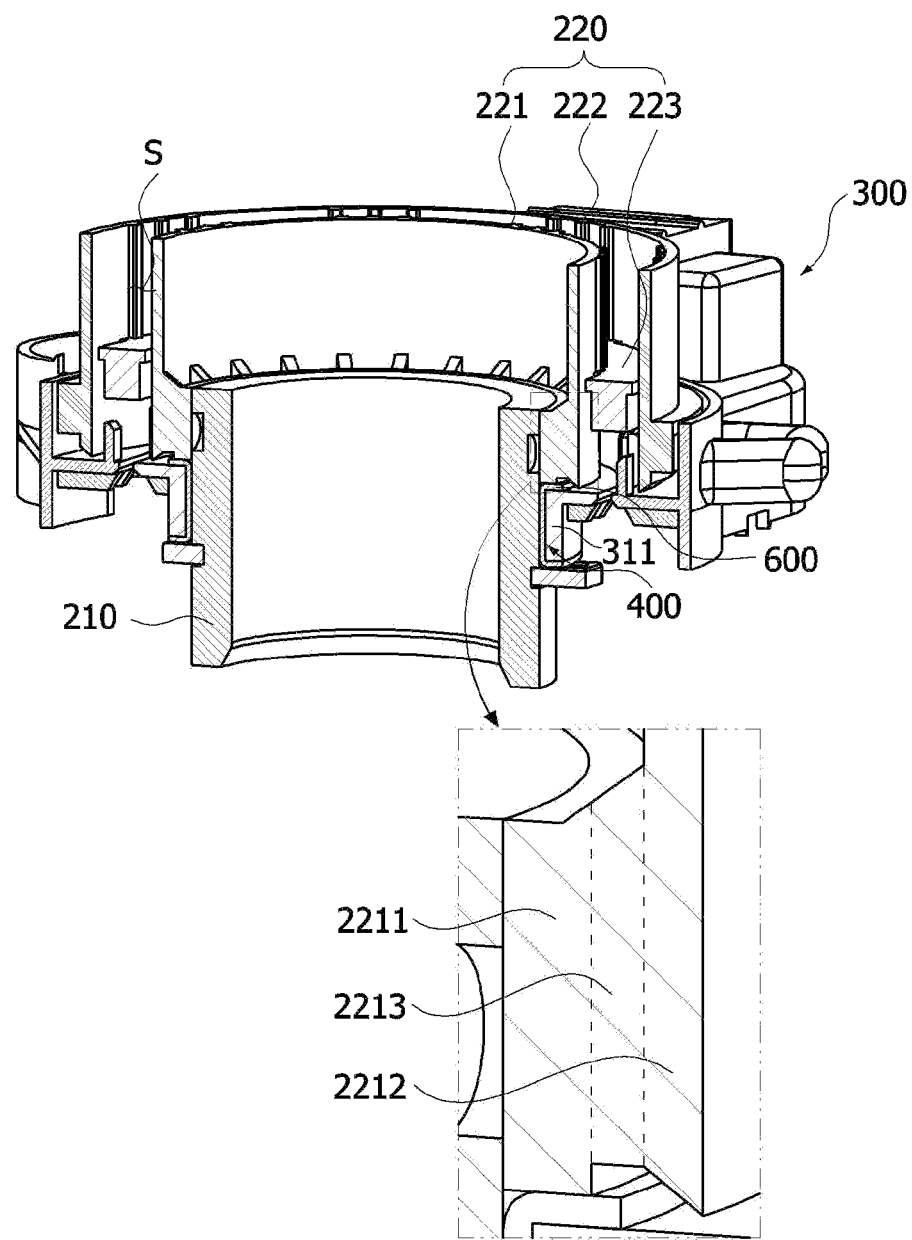

[FIG. 7]
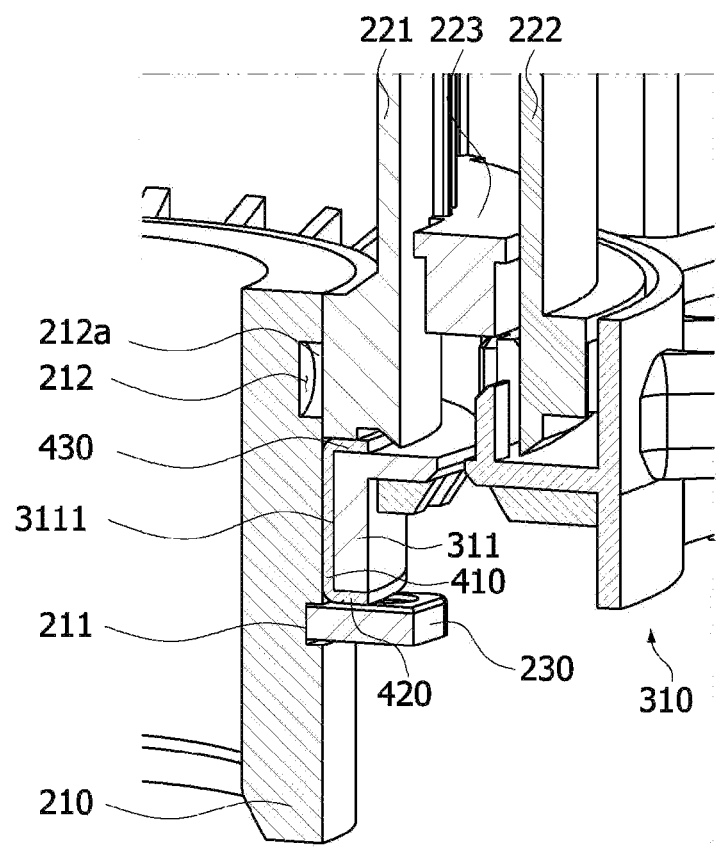

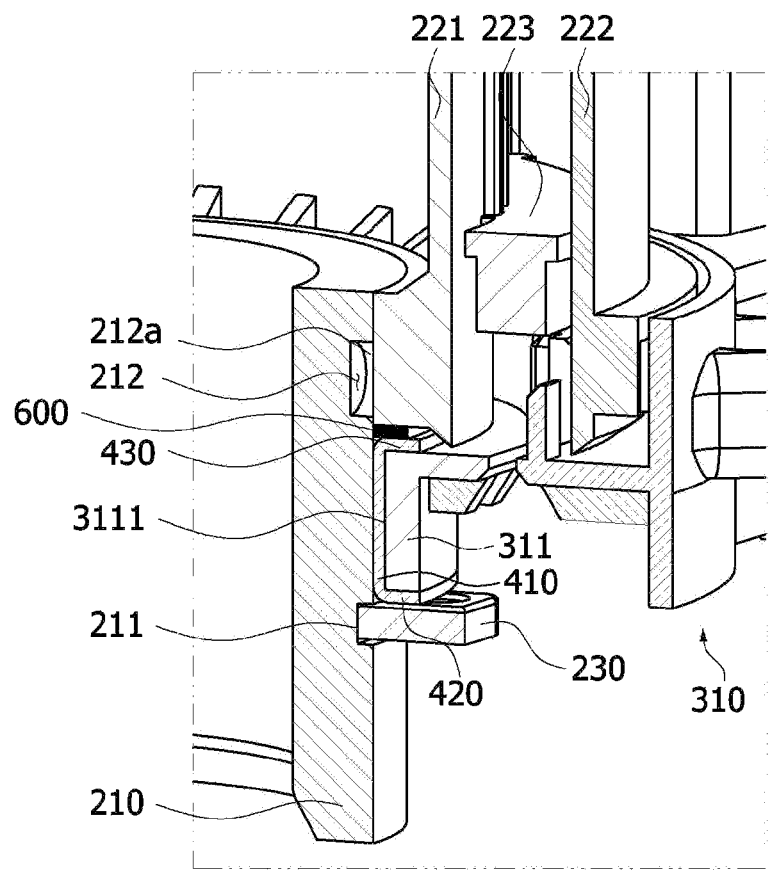
[FIG. 8]

【FIG. 9】
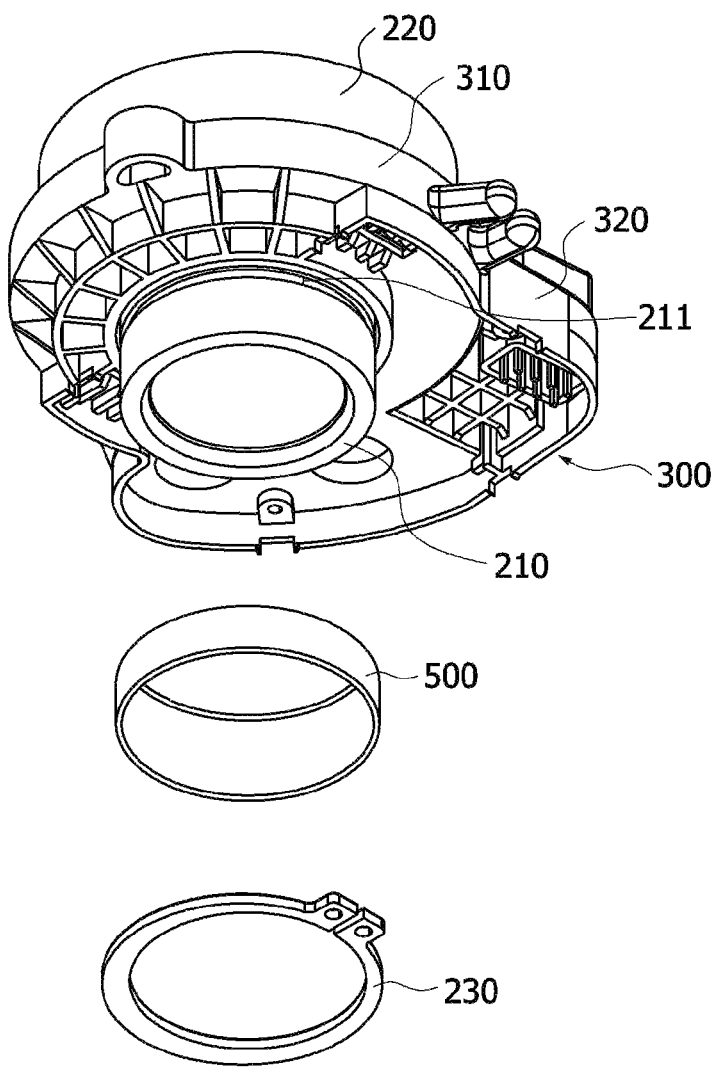

SENSING APPARATUS FOR USE IN POWER STEERING SYSTEM OF A VEHICLE

CROSS-REFERENCE TO RELATED PATENT APPLICATIONS

This application is a U.S. National Stage Application under 35 U.S.C. § 371 of PCT Application No. PCT/KR2019/016327, filed Nov. 26, 2019, which claims priority to Korean Patent Application No. 10-2018-0166876, filed Dec. 21, 2018, whose entire disclosures are hereby incorporated by reference.

TECHNICAL FIELD

An embodiment relates to a sensing apparatus.

BACKGROUND ART

Since a power steering system (electronic power system, hereinafter referred to as 'EPS') guarantees turning stability by driving a sensing apparatus in an electronic control unit according to driving conditions and provides a quick restoring force, a driver can safely drive.

The EPS includes a sensor assembly which measures a torque of a steering shaft, a steering angle, and the like to provide an appropriate torque. The sensor assembly can include a torque sensor which measures a torque applied to the steering shaft and an index sensor which measures an angular acceleration of the steering shaft. Further, the steering shaft can include an input shaft connected to a handle, an output shaft connected to a power transmission configuration at the wheel side, and a torsion bar which connects the input shaft and the output shaft.

The torque sensor measures a degree of torsion of the torsion bar and then measures the torque applied to the steering shaft. Further, the index sensor detects the rotation of the output shaft and measures the angular acceleration of the steering shaft. In the sensor assembly, the torque sensor and the index sensor may be disposed together and integrally configured.

The torque sensor may measure the torque by including a housing, a rotor, a stator, and a collector. The stator may include a first holder, a second holder, and stator teeth. In this case, the stator is partially accommodated in the housing, and there is a problem in that excessive noise is generated while sliding with the first holder made of metal and the housing made of plastic.

DISCLOSURE

Technical Problem

Accordingly, an embodiment is directed to providing a sensing apparatus capable of reducing noise and abrasion between a stator and a housing.

Specifically, an embodiment is directed to providing a sensing apparatus capable of reducing frictional noise and abrasion between the housing and the first holder during driving by disposing a metal member formed of a material the same as the first holder, on a sliding portion of an inner side surface of the housing.

Further, an embodiment is directed to providing a sensing apparatus capable of reducing frictional noise and abrasion between the first holder and a second holder by disposing a metal member on a sliding portion between the first holder and the second holder.

Problems solved by the embodiment are not limited to the above-mentioned problems, and other problems which are not mentioned may be understood by those skilled in the art from the following disclosure.

Technical Solution

An embodiment provides a sensing apparatus including: a first rotation part; a second rotation part in which the first rotation part is disposed; a housing in which the second rotation part is disposed; and a first metal member disposed between the second rotation part and the housing, wherein the second rotation part includes a first holder and a second holder coupled to the first holder, and the first metal member includes a body disposed between the first holder and the housing and a first flange portion extending radially outward from the body.

Preferably, the housing may include an opening portion having the first holder disposed at an inner side thereof, and the second holder may be seated on the opening portion.

Preferably, the first metal member may be fixed to the opening portion, and the first metal member may not overlap the second holder in a direction perpendicular to a rotational axis.

Preferably, the first flange portion may come into contact with an end portion opposite the second holder of the opening portion.

Preferably, an outer side end of the first flange portion may be collinearly disposed with an outer side surface of the opening portion in an axial direction.

Preferably, the first holder and the opening portion may be spaced apart from each other in a radial direction, the first metal member may be disposed between the first holder and the opening portion in the radial direction, and an outer circumferential surface of the first holder may come into contact with the first metal member.

Preferably, a first groove may be formed in the outer circumferential surface of the first holder, and the first holder may include an engaging member disposed in the first groove.

Preferably, the second holder and the engaging member may be spaced apart from each other in an axial direction, and the first metal member may be disposed between an end portion of the second holder and the engaging member in the axial direction.

Preferably, the engaging member may be formed in a ring shape, and an inner circumferential surface of the engaging member may come into contact with the second holder.

Preferably, the first metal member may include a second flange portion extending radially outward from the body, the second holder and the housing may be spaced apart from each other in an axial direction, and the second flange portion may be disposed between the second holder and the housing in the axial direction.

Preferably, a separation distance between the second holder and the housing in the axial direction may be the same as a thickness of the second flange portion in the axial direction.

Preferably, the sensing apparatus may include a second metal member between the second holder and the second flange portion.

Preferably, a separation distance between the second holder and the housing in the axial direction may be the same as a sum of thicknesses of the second flange portion and the second metal member in the axial direction.

Preferably, a plurality of second grooves disposed to be spaced apart from each other in a radial direction may be formed in an outer circumferential surface of the first holder, and the plurality of second grooves may overlap the second holder in the radial direction.

Preferably, the first holder may be formed with a sidewall overlapping the second groove in the radial direction, and the sidewall may be formed as a curved surface.

Preferably, the first holder may be formed with a bottom surface overlapping the second groove in the radial direction, and the bottom surface may become closer to the second holder in a circumferential direction.

Preferably, the second holder may include an inner side portion coupled to the first holder, an outer side portion disposed to be spaced apart from an outer side of the inner side portion based on a radial direction, and a partition plate configured to connect the inner side portion and the outer side portion.

Preferably, the inner side portion may include a first region which has the first holder disposed at an inner side thereof and one end seated on the housing, a second region disposed to be spaced apart from an outer side of the first region based on the radial direction, and a third region configured to connect the first region and the second region.

Preferably, the other end of the first region may have the same height as an end portion of the first holder.

Preferably, a thickness of the first region in the radial direction may be larger than a separation distance between the first holder and the opening portion.

Preferably, the second region and the third region may be spaced apart from the opening portion in an axial direction, and the opening portion may become closer from the third region toward the second region.

Preferably, a length of the second flange portion in the radial direction may be larger than a thickness of the first region in the radial direction, and an outer side end of the second flange portion may overlap the third region in the axial direction.

Preferably, the second metal member may be disposed between the first region and the second flange portion.

Another embodiment provides a sensing apparatus including: a first rotation part; a second rotation part in which the first rotation part is disposed; a housing in which the second rotation part is disposed; and a first metal member disposed between the housing and the second rotation part, wherein the second rotation part includes a first holder and a second holder coupled to the first holder, and the first metal member is disposed between the first holder and the housing and fixed to the housing.

Advantageous Effects

In a sensing apparatus having the above-described configurations according to an embodiment, since a first metal member is disposed on sliding portions of a housing and a first holder, and thus the first holder slides on the same metal material while rotating, noise and abrasion generated between the first holder and the housing can be reduced.

Further, since a second flange portion and a second metal member which are formed of a metal material are disposed on sliding portions of the first holder and a second holder, and thus the first holder slides on the same metal material while rotating, noise and abrasion generated between the first holder and the second holder can be reduced.

In addition, since a cylindrical first metal member is disposed on the sliding portions of the first holder and the housing having the highest noise, the noise can be effectively reduced while simplifying a shape.

DESCRIPTION OF DRAWINGS

FIG. 1 is a perspective view illustrating a sensing apparatus according to an embodiment.

FIG. 2 is a perspective view illustrating a second rotation part and a housing shown in FIG. 1.

FIG. 3 is an exploded perspective view of the second rotation part, the housing, and a first metal member.

FIG. 4 is a cross-sectional view taken along line A-A in FIG. 2.

FIG. 5 is an enlarged view of a portion in FIG. 4.

FIG. 6 is a cross-sectional view illustrating a modified example of the first metal member.

FIG. 7 is an enlarged view of a portion in FIG. 6.

FIG. 8 is a cross-sectional view including a second metal member.

FIG. 9 is an exploded perspective view illustrating another modified example of the first metal member.

MODES OF THE INVENTION

Hereinafter, preferred embodiments of the present invention will be described in detail with reference to the accompanying drawings.

However, the technical spirit of the present invention is not limited to some embodiments which will be described and may be embodied in various forms, and one or more elements in the embodiments may be selectively combined and replaced to be used within the scope of the technical spirit of the present invention.

Further, terms used in the embodiments of the present invention (including technical and scientific terms), may be interpreted with meanings that are generally understood by those skilled in the art unless particularly defined and described, and terms which are generally used, such as terms defined in a dictionary, may be understood in consideration of their contextual meanings in the related art.

In addition, terms used in the description are provided not to limit the present invention but to describe the embodiments.

In the specification, the singular form may also include the plural form unless the context clearly indicates otherwise and may include one or more of all possible combinations of A, B, and C when disclosed as at least one (or one or more) of "A, B, and C".

Further, terms such as first, second, A, B, (a), (b), and the like may be used to describe elements of the embodiments of the present invention.

The terms are only provided to distinguish the elements from other elements, and the essence, sequence, order, or the like of the elements are not limited by the terms.

Further, when particular elements are disclosed as being "connected," "coupled," or "linked" to other elements, the elements may include not only a case of being directly connected, coupled, or linked to other elements but also a case of being connected, coupled, or linked to other elements by elements between the elements and other elements.

In addition, when one element is disclosed as being formed "on or under" another element, the term "on or under" includes both a case in which the two elements are in direct contact with each other and a case in which at least another element is disposed between the two elements (indirectly). Further, when the term "on or under" is expressed, a meaning of not only an upward direction but also a downward direction may be included based on one element.

Hereinafter, the embodiments will be described in detail with reference to the accompanying drawing drawings, the same reference numerals are applied to the same or corresponding elements, and redundant description thereof will be omitted.

FIG. 1 is a perspective view illustrating a sensing apparatus according to an embodiment, FIG. 2 is a perspective view illustrating a second rotation part and a housing shown in FIG. 1, FIG. 3 is an exploded perspective view of the second rotation part, the housing, and a first metal member, FIG. 4 is a cross-sectional view taken along line A-A in FIG. 2, and FIG. 5 is an enlarged view of a portion in FIG. 4.

Referring to FIGS. 1 to 5, a sensing apparatus 1 according to the embodiment may include a first rotation part 100, a second rotation part 200, a housing 300, and a first metal member 400.

Here, an inner side may refer to a direction disposed toward a center C with respect to a radial direction of the second rotation part 200, and an outer side may refer to a direction opposite the inner side.

In this case, the second rotation part 200 may be connected to an output shaft (not shown), and the first rotation part 100 of which at least a portion is rotatably disposed in the second rotation part 200 may be connected to an input shaft (not shown), but the present invention is not necessarily limited thereto.

The first rotation part 100 includes a magnet (not shown). The first rotation part 100 may be rotatably disposed relative to the second rotation part 200.

The second rotation part 200 may include a first holder 210, a second holder 220, and an engaging member 230.

The first holder 210 may be connected to an output shaft of an electric steering device. Accordingly, the first holder 210 may rotate in conjunction with rotation of the output shaft. The first holder 210 may be formed in a cylindrical shape. Further, the first holder 210 may be made of a metal material.

The first holder 210 may include a first groove 211. The first groove 211 is formed in a portion exposed from the housing 300 of the first holder 210. The first groove 211 is formed to be concave along an outer circumferential surface. The engaging member 230 is disposed in the first groove 211

The first holder 210 may be coupled to the second holder 220.

A plurality of second grooves 212 may be formed in the outer circumferential surface of the first holder 210 which is coupled to the second holder 220. The second grooves 212 may be disposed in plurality. The plurality of second grooves 212 may be spaced apart along a circumferential direction of the first holder 210. The first holder 210 may include a sidewall 212a surrounding the second grooves 212, and the sidewall 212a may have a curved surface. In this case, the second groove 212 may have a 'D' shape. Further, the first holder 210 has a bottom surface facing the second grooves 212, and the bottom surface may be inclined toward a sidewall. That is, the second groove 212 may have a shape in which a depth increases toward the curved surface 212a. The second grooves 212 may prevent separation of the first holder 210 and the second holder 220, and prevent the first holder 210 from slipping while the second rotation part 200 rotates.

The second holder 220 may be disposed at one side end portion of the first holder 210. The second holder 220 may be coupled to the first holder 210 by an insert injection method. The second holder is supported by the housing 300. The second holder 220 may be made of a plastic material.

The second holder 220 includes an inner side portion 221, an outer side portion 222, and a partition plate 223. Each of the inner side portion 221 and the outer side portion 222 has a cylindrical shape. The outer side portion 222 is disposed to be spaced apart from an outer side of the inner side portion 221 based on the radial direction. The partition plate 223 connects the inner side portion 221 and the outer side portion 222. The inner side portion 221, the outer side portion 222, and the partition plate 223 may be integrated. The first holder 210 may be coupled to an inner side of the inner side portion 221. A space S may be formed between the outer side portion 222 and the inner side portion 221. The partition plate 223 may be formed in a plate shape. The partition plate 223 may be disposed between the inner side portion 221 and the outer side portion 222.

The inner side portion 221 may include a first region 2211, a second region 2212, and a third region 2213.

The first holder 210 is disposed at an inner side of the first region 2211. One end of the first region 2211 is seated on an opening portion 311. In this case, a length of the first region 2211 in the radial direction is larger than a distance between the first holder 210 and the housing opening portion 311 in the radial direction. In this case, the other end surface of the first region 2211 is collinearly disposed with an end surface of the first holder 210 in a direction perpendicular to the rotational axis.

The second region 2212 is disposed at an outer side the first region 2211 based on the radial direction. One end of the second region 2212 is inclined to outwardly protrude in a direction of the rotational axis. The other end surface of the second region 2212 is collinearly disposed with the end surface of the outer side portion 222 in a direction perpendicular to the rotational axis.

The third region 2213 connects the first region 2211 and the second region 2212 to each other. One end of the third region 2213 is recessed in the direction of the rotational axis. The other end of the second region 2212 is inclined to outwardly protrude in the direction of the rotational axis.

The engaging member 230 serves to prevent separation of the housing 300 from a lower side of the second rotation part 200. The engaging member 230 may have a C-ring shape. The engaging member 230 may be made of a metal material. The engaging member 230 may be made of an elastically deformable material.

The engaging member 230 is coupled to the first groove 211 of the first holder 210. The engaging member 230 has a shape corresponding to the first groove 211. The engaging member 230 may be detachably coupled to the first holder 210. The engaging member 230 is located under the lower surface of the housing 300 while being coupled to the first holder 210. In addition, the engaging member 230 may be disposed below a first flange portion 420 to support a lower surface of the first flange portion 420. In this case, a diameter of an outer ring of the engaging member 230 may be formed to be larger than an opening 3111 of the housing 300.

The housing 300 has a plate shape including an upper surface and a lower surface, and upper and lower portions are open. The housing 300 includes the opening portion 311 in which the opening 3111 is formed in the center. The first holder 210 is located at an inner side of the opening 3111.

The housing 300 may include a first body 310 and a second body 320.

In the first body 310, the opening portion 311 is disposed at the center, and a portion of the first holder 210 is disposed at the inner side of the opening 3111. In this case, since a diameter of the first holder 210 is formed to be smaller than a diameter of the opening 3111, a gap is generated between the first holder 210 and an inner side surface of the opening 3111. A portion of the first metal member 400 is disposed between the first holder 210 and the inner side surface of the opening 3111.

The second body 320 is connected to the first body 310 and has a plurality of gears (not shown) disposed therein, and is connected to an external cable. The first body 310 and the second body 320 are made of plastic and may be integrally formed.

The first metal member 400 is disposed between the second rotation part 200 and the housing 300. The first metal member 400 is disposed to surround a portion of the opening portion 311.

The first metal member 400 may include a body 410 and the first flange portion 420. In this case, the body 410 and the first flange portion 420 may be integrally formed. The first metal member 400 may be coupled to the opening portion 311 of the housing 300 by an insert injection method.

The body 410 is disposed between the first holder 210 and the housing 300. The body 410 is disposed between the first holder 210 and the housing opening portion 311 based on the radial direction of the second rotation part 200. In the body 410, a size of an outer ring corresponds to a size of the housing opening 3111, and a size of an inner ring corresponds to a size of an outer ring of the first holder 210. The body 410 may be made of a metal material.

That is, the body 410 is disposed on the sliding portions of the first holder 210 and the housing opening portion 311 to prevent noise generated when the first holder 210 made of a metal material and the housing 300 made of a plastic material slide. In this case, the first holder 210 slides with the body 410 made of the same metal material while rotating. Like the above, when components made of different metal materials slide, noise may be significantly reduced compared to a case in which components made of a metal material and components made of a plastic material slide.

The first flange portion 420 extends radially outward from one end of the body 410. In this case, the first flange portion 420 is disposed between an end portion of the opening portion 311 and the engaging member 230 based on the axial direction of the second rotation part 200. One surface of the first flange portion 420 may come into contact with the end portion of the opening portion 311, and the other surface of the first flange portion 420 may come into contact with an upper surface of the engaging member 230. In this case, the end surface of the first flange portion 420 is collinearly disposed with the outer surface of the opening portion 311 in the direction of the rotational axis.

The first flange portion 420 is disposed on the sliding portions of the engaging member 230 and the housing opening portion 311 to prevent noise generated by the sliding of the engaging member 230 made of a metal material and the housing 300 made of the plastic material. In this case, the engaging member 230 slides with the first flange portion 420 made of the same metal material while being rotated by the first holder 210. Like the above, when components made of different metal materials slide, noise may be significantly reduced compared to the case in which the components made of the metal material and the components made of the plastic material slide.

FIG. 6 is a cross-sectional view illustrating a modified example of the first metal member, and FIG. 7 is an enlarged view of a portion in FIG. 6.

Referring to FIGS. 6 and 7, the sensing apparatus according to the embodiment may include a second flange portion 430.

The second flange portion 430 extends radially outward from the other end of the body 410. The second flange portion 430 may be made of a metal material. The second flange portion 430 is disposed between an upper end of the opening portion 311 and a lower end of the second holder 220 based on the axial direction of the second rotation part 200. The second flange portion 430 may have one surface which comes into contact with an upper end surface of the opening portion 311 and the other surface which comes into contact with a lower end surface of the inner side portion 221 of the second holder.

A radial length of the second flange portion 430 is longer than a radial length of the first region 2211 and shorter than a radial length of the inner side portion 221. In this case, the end surface of the second flange portion 430 is spaced apart from an inclination of the second region 2212.

The second flange portion 430 may be coupled to the opening portion 311 of the housing by an insert injection method. In this case, the body 410, the first flange portion 420, and the second flange portion 430 may be integrally formed, but the present invention is not limited thereto. The body 410, the first flange portion 420, and the second flange portion 430 may be insert-injected into the housing 300 while being spaced apart from each other.

FIG. 8 is a cross-sectional view including a second metal member.

Referring to FIG. 8, a second metal member 600 is disposed between the second holder 220 and the second flange portion 430. The second metal member 600 is formed in a ring shape corresponding to the end surface of the second holder 220. The second metal member 600 may have a longer radial length than an axial length. The second metal member 600 may have a shorter radial length than the second flange portion 430. In this case, the second metal member 600 is fixed to the second holder 220. More preferably, the second metal member 600 may be disposed on the first region 2211. Further, the second metal member 600 may be coupled to the second holder 220 by insert injection. In this case, the second metal member 600 slides with the second flange portion 430 while being rotated by the second holder 220. Like the above, in the second holder 220 and the housing opening portion 311, since the second flange portion 430 and the second metal member 600 made of the metal material are disposed on the sliding portion, noise generated by plastic friction between the second holder 220 and the housing opening portion 311 may be reduced.

FIG. 9 is an exploded perspective view illustrating another modified example of the first metal member.

Referring to FIG. 9, a first metal member 500 is formed in a cylindrical shape. The first metal member 500 is disposed between the first holder 210 and the housing opening portion 311. In this case, the first metal member 500 is coupled to the opening portion 311 by insert injection. The first metal member 500 does not overlap the second holder 220 in the direction perpendicular to the rotational axis. Since the first metal member 500 is disposed on the sliding portions of the first holder 210 and the housing 300 having the highest noise, the noise may be reduced while simplifying the shape.

In the above, the sensing apparatus according to one preferable embodiment of the present invention was looked at in detail with reference to the accompanying drawings.

The embodiment of the present invention should be considered to be exemplary and not limiting, and the scope of the present invention will be shown by the appended claims rather than the above-described detailed description. Further, all possible changes or modifications in forms derived from meanings and the scope of the claims and their equivalents should be considered to be within the scope of the present invention.

[Reference numerals]

| | |
|---|---|
| 100: first rotation part | 200: second rotation part |
| 210: first holder | 211: first groove |
| 212: second groove | 212a: curved surface |
| 220: second holder | 221: inner side portion |
| 2211: first region | 2212: second region |
| 2213: third region | 222: outer side portion |
| 223: partition plate | 230: engaging member |
| 300: housing | 310: first body |
| 320: second body | 400, 500: first metal member |
| 410: body | 420: first flange portion |
| 430: second flange portion | 600: second metal member |

The invention claimed is:

1. A sensing apparatus comprising:
a first rotation part;
a second rotation part in which the first rotation part is disposed;
a housing in which the second rotation part is disposed; and
a first metal member disposed between the second rotation part and the housing,
wherein:
the second rotation part includes a first holder and a second holder coupled to the first holder;
the first holder is made of a metal material;
the first metal member includes a body disposed between the first holder and the housing and a first flange portion extending radially outward from the body;
the housing includes an opening portion having the first holder disposed at an inner side thereof; and
the second holder is seated on the opening portion.

2. The sensing apparatus of claim 1, wherein:
the first metal member is fixed to the opening portion; and
the first metal member does not overlap the second holder in a direction perpendicular to a rotational axis.

3. The sensing apparatus of claim 1, wherein:
the first flange portion comes into contact with an end portion opposite the second holder of the opening portion; and
an outer side end of the first flange portion is collinearly disposed with an outer side surface of the opening portion in an axial direction.

4. The sensing apparatus of claim 1, wherein:
the first holder and the opening portion are spaced apart from each other in a radial direction;
the first metal member is disposed between the first holder and the opening portion in the radial direction; and
an outer circumferential surface of the first holder comes into contact with the first metal member.

5. The sensing apparatus of claim 1, wherein the second holder includes an inner side portion coupled to the first holder, an outer side portion disposed to be spaced apart from an outer side of the inner side portion based on a radial direction, and a partition plate configured to connect the inner side portion and the outer side portion.

6. The sensing apparatus of claim 5, wherein the inner side portion includes a first region which has the first holder disposed at an inner side thereof and one end seated on the housing, a second region disposed to be spaced apart from an outer side of the first region based on the radial direction, and a third region configured to connect the first region and the second region.

7. The sensing apparatus of claim 6, wherein:
the other end of the first region has the same height as an end portion of the first holder; and
a thickness of the first region in the radial direction is larger than a separation distance between the first holder and the opening portion.

8. The sensing apparatus of claim 6, wherein:
the second region and the third region are spaced apart from the opening portion in an axial direction; and
the opening portion becomes closer from the third region toward the second region.

9. The sensing apparatus of claim 6, wherein:
the first metal member includes a second flange portion extending radially outward from the body;
a length of the second flange portion in the radial direction is larger than a thickness of the first region in the radial direction; and
an outer side end of the second flange portion overlaps the third region in the axial direction.

10. The sensing apparatus of claim 6, wherein:
the first metal member includes a second flange portion extending radially outward from the body;
the sensing apparatus includes a second metal member between the second holder and the second flange portion; and
the second metal member is disposed between the first region and the second flange portion.

11. A sensing apparatus comprising:
a first rotation part;
a second rotation part in which the first rotation part is disposed;
a housing in which the second rotation part is disposed; and
a first metal member disposed between the second rotation part and the housing,
wherein:
the second rotation part includes a first holder and a second holder coupled to the first holder;
the first holder is made of a metal material;
the first metal member includes a body disposed between the first holder and the housing and a first flange portion extending radially outward from the body;
a first groove is formed in an outer surface circumferential of the first holder;
the first holder includes an engaging member disposed in the first groove;
the second holder and the engaging member are spaced apart from each other in an axial direction; and
the first metal member is disposed between an end portion of the second holder and the engaging member in the axial direction.

12. The sensing apparatus of claim 11, wherein:
the engaging member is formed in a ring shape; and
an inner circumferential surface of the engaging member comes into contact with the second holder.

13. A sensing apparatus comprising:
a first rotation part;
a second rotation part in which the first rotation part is disposed;

a housing in which the second rotation part is disposed; and a first metal member disposed between the second rotation part and the housing, wherein:
- the second rotation part includes a first holder and a second holder coupled to the first holder;
- the first holder is made of a metal material;
- the first metal member includes a body disposed between the first holder and the housing and a first flange portion extending radially outward from the body;
- the first metal member includes a second flange portion extending radially outward from the body;
- the second holder and the housing are spaced apart from each other in an axial direction; and
- the second flange portion is disposed between the second holder and the housing in the axial direction.

14. The sensing apparatus of claim 13, wherein a separation distance between the second holder and the housing in the axial direction is the same as a thickness of the second flange portion in the axial direction.

15. The sensing apparatus of claim 13, comprising a second metal member between the second holder and the second flange portion.

16. The sensing apparatus of claim 15, wherein a separation distance between the second holder and the housing in the axial direction is the same as a sum of thicknesses of the second flange portion and the second metal member in the axial direction.

17. A sensing apparatus comprising:
a first rotation part;
a second rotation part in which the first rotation part is disposed;
a housing in which the second rotation part is disposed; and
a first metal member disposed between the second rotation part and the housing,
wherein:
- the second rotation part includes a first holder and a second holder coupled to the first holder;
- the first holder is made of a metal material;
- the first metal member includes a body disposed between the first holder and the housing and a first flange portion extending radially outward from the body;
- a plurality of second grooves disposed to be spaced apart from each other in a radial direction are formed in an outer circumferential surface of the first holder;
- the plurality of second grooves overlap the second holder in the radial direction;
- the first holder is formed with a sidewall overlapping the second groove in the radial direction; and
- the sidewall is formed as a curved surface.

18. The sensing apparatus of claim 17, wherein:
the first holder is formed with a bottom surface overlapping the second groove in the radial direction; and
the bottom surface becomes closer to the second holder in a circumferential direction.

19. A sensing apparatus comprising:
a first rotation part;
a second rotation part in which the first rotation part is disposed;
a housing in which the second rotation part is disposed; and
a first metal member disposed between the housing and the second rotation part,
wherein
- the second rotation part includes a first holder and a second holder coupled to the first holder,
- the first metal member is disposed between the first holder and the housing and fixed to the housing, and
- the second holder includes an inner side portion coupled to the first holder, an outer side portion disposed to be spaced apart from an outer side of the inner side portion based on a radial direction, and a partition plate configured to connect the inner side portion and the outer side portion.

* * * * *